United States Patent
Jonnala et al.

(10) Patent No.: US 12,192,761 B1
(45) Date of Patent: Jan. 7, 2025

(54) SYSTEMS AND METHODS FOR BOOTSTRAPPED ONBOARDING OF CELLULAR DEVICES

(71) Applicant: T-Mobile USA, Inc., Bellevue, WA (US)

(72) Inventors: Deepthi Jonnala, Renton, WA (US); Phani Ramisetty, Sammamish, WA (US); Kyeong Hun An, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 494 days.

(21) Appl. No.: 17/390,053

(22) Filed: Jul. 30, 2021

(51) Int. Cl.
*H04W 12/06* (2021.01)
*H04L 67/12* (2022.01)
*H04W 8/18* (2009.01)
*H04W 12/40* (2021.01)
*H04W 60/00* (2009.01)
*G16Y 10/75* (2020.01)
*G16Y 30/10* (2020.01)

(52) U.S. Cl.
CPC .......... *H04W 12/068* (2021.01); *H04L 67/12* (2013.01); *H04W 8/18* (2013.01); *H04W 12/40* (2021.01); *H04W 60/00* (2013.01); *G16Y 10/75* (2020.01); *G16Y 30/10* (2020.01)

(58) Field of Classification Search
CPC ..... H04W 12/068; H04W 8/18; H04W 12/40; H04W 60/00; H04L 67/12; G16Y 10/75; G16Y 30/10
See application file for complete search history.

(56) References Cited

U.S. PATENT DOCUMENTS

| | | | | |
|---|---|---|---|---|
| 10,447,683 | B1* | 10/2019 | Loladia | H04W 12/71 |
| 2007/0091843 | A1* | 4/2007 | Patel | H04W 8/04 370/331 |
| 2017/0048645 | A1* | 2/2017 | Yerrabommanahalli | H04L 61/106 |
| 2018/0018184 | A1* | 1/2018 | Dumov | H04W 4/14 |
| 2019/0158355 | A1* | 5/2019 | Ramisetty | H04L 63/0853 |
| 2020/0313866 | A1* | 10/2020 | Mondello | H04W 12/35 |

FOREIGN PATENT DOCUMENTS

CN 110650114 A * 1/2020 ............... G06F 1/32

* cited by examiner

Primary Examiner — Mohammed Waliullah
(74) Attorney, Agent, or Firm — Lee & Hayes, P.C.

(57) ABSTRACT

Systems and methods for using a bootstrap Subscriber Identity Module (SIM) to bootstrap an Internet-of-Things (IoT) device on a cellular network. The IoT device uses bootstrap information stored on the bootstrap SIM to authenticate the IoT device with the cellular network. The cellular network receives the bootstrap information and uses a certificate repository to check the bootstrap information against. Upon successful authentication, the IoT device is provided with credentials to register the IoT device on the cellular network.

16 Claims, 5 Drawing Sheets

SYSTEMS AND METHODS FOR BOOTSTRAPPED ONBOARDING OF CELLULAR DEVICES

BACKGROUND

Devices that operate in Internet of Things (IoT) networks typically need to be authenticated with a cellular network when initialized for operation. To authenticate IoT devices, an operator of an IoT cellular network will often transmit keys to devices. When the end user activates the device, the device communicates with the IoT cellular network and uses these keys (one-time passwords (OTP)) to authenticate. However, due to a proliferation of resellers and wholesale distributors, it can be difficult to maintain a correct database of OTPs at the IoT server of the IoT cellular network. This can lead to difficulties in authenticating (or onboarding) IoT devices. Further, sharing keys between the device and the cellular network during an authentication operation can introduce security issues.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Examples of the present disclosure can comprise systems and methods for bootstrapped onboarding of cellular devices. In some examples of the presently disclosed subject matter, a bootstrap subscriber identity (or identification) module (SIM) is provided. Unlike conventional SIMs, the bootstrap SIM of the presently disclosed subject matter allows for the bootstrapping of a cellular device to which the SIM is assigned. The bootstrap SIM includes credentials that allow the cellular device to communicate with a bootstrap server of an IoT cellular network. The bootstrap server receives authentication information from the bootstrap SIM and sends, to the device, credentials to be used to register the device with the IoT cellular network.

The bootstrap server may be provided by the network or be provided by a central entity for use by more than one network. In some examples, a specific IoT cellular network may partner with one or more manufacturers of IoT devices. The IoT cellular network uses the bootstrap SIM as a way to "bind" the IoT device to the IoT cellular network. In these examples, the IoT cellular network may maintain and control its own bootstrap server. In other examples, the IoT cellular network may be one of various other IoT cellular networks that maintain and utilize a central bootstrap server.

Figure 1:
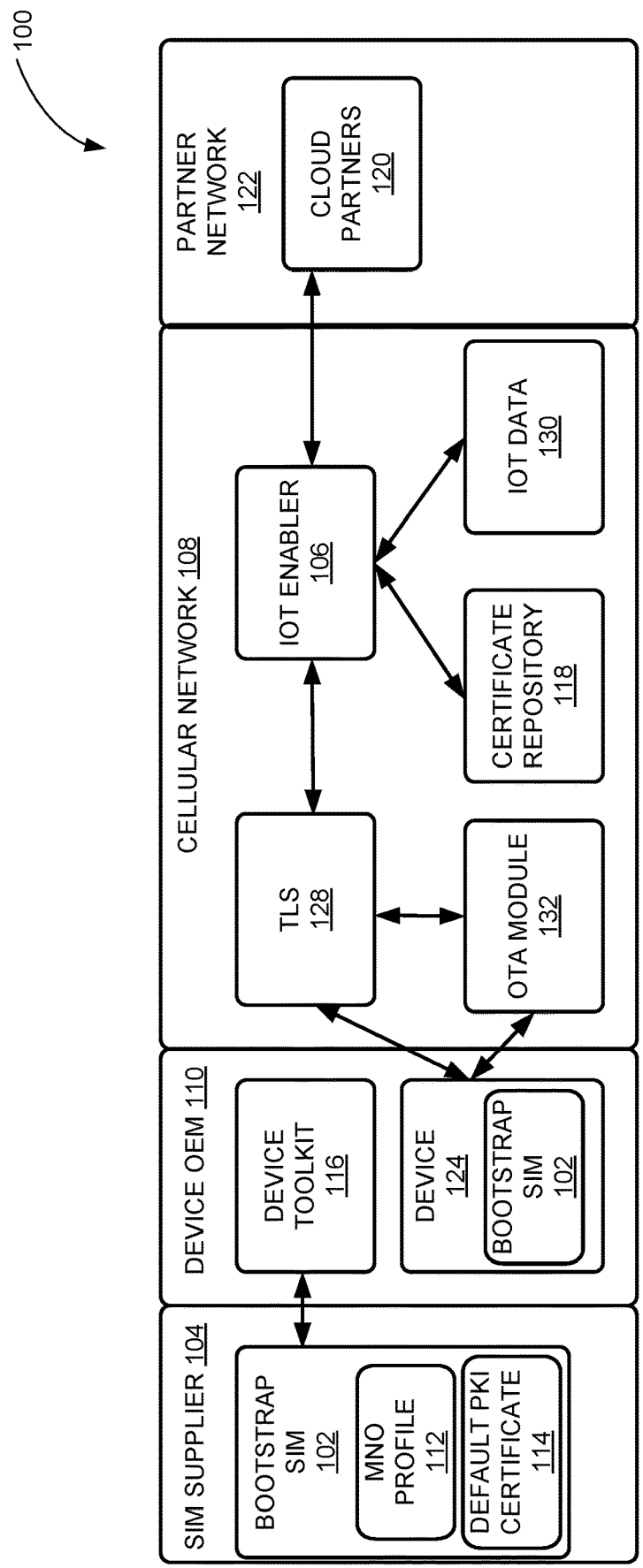
FIG. 1 illustrates an example environment for providing a bootstrap SIM, in accordance with some examples of the present disclosure.

FIG. 1 illustrates an example environment 100 for providing a bootstrap SIM 102, in accordance with some examples of the present disclosure. A SIM supplier 104 of the bootstrap SIM 102 manufactures or configures the bootstrap SIM 102 to function with an IoT enabler 106 of a cellular network 108. In general, the cellular network 108 can be implemented as a variety of technologies to provide wired and/or wireless access to a network, as discussed herein. In some instances, the cellular network 108 can include a 3GPP Radio Access Network (RAN), such a GSM/EDGE RAN (GERAN), a Universal Terrestrial RAN (UTRAN), a New Radio (for 5G), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the cellular network 108 can include any number and type of transceivers and/or base stations representing any number and type of macrocells, microcells, picocells, or femtocells, for example, with any type or amount of overlapping coverage or mutually exclusive coverage. Only for the purposes of providing a non-limiting example, the subject matter herein is described in terms of use in a 5G network, though the various technologies described herein may be implemented in other types of networks and are considered to be within the scope of the presently disclosed subject matter. In the presently described environment 100, the IoT enabler 106 acts as the bootstrap server for the bootstrap SIM 102.

In a manner different than conventional SIMs, the bootstrap SIM 102 acts as its own identifier. In conventional SIMs, the SIM inserted into a device was the same as other SIMs. Device OEMs, such as the device OEM 110, or more likely cellular networks, such as the cellular network 108, would program the SIM to operate on a particular network for a particular user. For example, some device OEMs would enter into agreements whereby the device was specially-purposed for a given network, the device OEM would program a SIM so that when the SIM was inserted into a device and registered with a particular network, the device would receive various passkeys and the like that identified the SIM. However, as the use of IoT devices that use SIMs has proliferated, conventional techniques for keeping track of and registering these devices have become difficult and burdensome. As mentioned above, often devices are registered with multiple networks over the life-span of the device. To accommodate the movement of IoT devices from one network to another often requires a high degree of communication between network as well as the maintenance of passkeys. In conventional systems, this process has resulted in the failure of an IoT device to be registerable on a network because of a loss of data or identification information and has introduced potential security issues into the process (described in more detail below).

To reduce the probability of these and others issues, and to provide for an improved registration experience, the bootstrap SIM 102 has programmed thereon its own identification information. The bootstrap SIM 102 does not rely completely on the ability of the cellular network 108 to find registration information. Thus, the SIM supplier 104 programs the bootstrap SIM 102 at the factory with a mobile network operator (MNO) profile 112, such as the profile of the cellular network 108. The MNO profile 112 comprises the identification of the cellular network 108 as well as some communication protocols associated with the cellular network 108.

The bootstrap SIM 102 is further configured to include a default PKI (Public Key Infrastructure) certificate 114. The default PKI certificate 114 is loaded and stored on the bootstrap SIM 102 and is used as the means by which the bootstrap SIM 102 provides its own certification information rather than relying on the transmission of passkeys and the like. The default PKI certificate 114 provides information such as the identity of the device to which the bootstrap SIM 102 is used. For example, the device OEM 110 may use a device toolkit 116 to provide to the SIM supplier 104 information relating to a particular device for which the bootstrap SIM 102 is to be used with. In other examples, the SIM supplier 104 may manufacture and provide to the device OEM 110 an unprogrammed bootstrap SIM 102, whereby the device OEM 110 uses the device toolkit 116 to program the bootstrap SIM 102.

The default PKI certificate 114 may further provide for mutual authentication of both the bootstrap SIM 102 and the cellular network 108. Further, the default PKI certificate 114 may also provide for the encryption of a communication channel between a device having the bootstrap SIM 102 installed and the cellular network 108. To provide for the maintenance, updating, and retrieval of the default PKI certificate 114 of the bootstrap SIM 102, as well as other bootstrap SIMs not illustrated, the environment 100 further includes a certificate repository 118. The certificate repository 118 is updated regularly to include new bootstrap SIMs 102 manufactured as well as modifications to the bootstrap SIM 102 made by one or more entities, such as the cellular network 108 itself or other cellular networks not illustrated. This certificate repository 118 may be shared with one or more cloud partners 120 in a partner network 122. The partner network 122 may be accessed and used by the cloud partners 120 (e.g. other cellular networks or MNO) to register bootstrap SIMs not originally configured to work on the network or devices of the cloud partners 120. Thus, the cloud partners 120 can use the default PKI certificate 114 information of one network, such as the cellular network 108, to allow for the bootstrapping of a device onto another network. This can avoid the need to exchange one cellular network's SIM for another cellular network's SIM when the device is authenticated and registered onto a different cellular network.

As noted above, the device 124 is an IoT device that may use the cellular network 108 to perform one or more operations associated with the device 124. Examples of the device 124 can include, but are not limited to, any portable electronic devices that can generate, request, receive, transmit, or exchange voice, video, and/or digital data over a network. Additional examples of the device 124 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network, such as the cellular network 108 or another network.

When the device 124 has the bootstrap SIM 102 installed and is ready to register and be used on the cellular network 108, the device 124 initiates a bootstrap request to an IoT enabler 106 using a secure channel, such as the transport layer security (TLS) 128, using the MNO profile 112 programmed onto the bootstrap SIM 102. It should be noted that there may be additional components of the cellular network 108 not illustrated that provides for communication over the TLS 128 (such as base stations and other network equipment). Further, other means of communication may be used, such as a secure socket layer (SSL) and other communication protocols. Thus, the presently disclosed subject matter is not limited to a particular communication protocol or network equipment used to facilitate the communication. The device 124 provides to the IoT enabler 106 authorizing information, such as the default PKI certificate 114, which has been loaded, or provisioned, into the certificate repository 118. If the information provided by the bootstrap SIM 102 is authenticated by the IoT enabler 106, the IoT enabler 106 accesses IoT data 130 to provide communication information to the device 124, including, but not limited to, device management parameters and other credentials needed by the device 124 to operate on the cellular network 108.

This process can provide for various advantages over conventional systems. In one example, the presently disclosed subject matter reduces or eliminates security issues when sharing PSK (keys) between the cellular network 108 and the device 124. In conventional systems that use PKIs, there may be security issues relating to the receipt or use of these PKIs by unauthorized sources. Thus, an unauthorized user may be able to use PKIs intended for another device to register an unauthorized device on a network. Using the bootstrap SIM 102 avoids the need to transfer PKIs between a potentially unauthorized device and a potentially vulnerable network.

In another example of an advancement over conventional systems, the default PKI certificate 114 and/or the MNO profile 112 may be modified using an over-the-air (OTA) module 132. Once registered and the communication becomes secured, the modifiable nature of the bootstrap SIM 102 provides for updating over a secured connection to the cellular network using the OTA module 132. The OTA module 132 can be used by the cellular network 108 to update various bootstrapping (as well as other) information on the bootstrap SIM 102. For example, if the cellular network 108 detected a security issue with a current set of default PKI certificates of various bootstrap SIMs using the cellular network 108, the cellular network 108 can send an update to all currently used and to be used bootstrap SIMs to update various information. Thus, security issues presented by potentially compromised information can be reduced or abated by updating an entire network of bootstrap SIMs. In another example, a particular bootstrap SIM may need updating. The OTA module 132 may be used to communicate with that particular bootstrap SIM to update information programmed on the bootstrap SIM.

Figure 2:
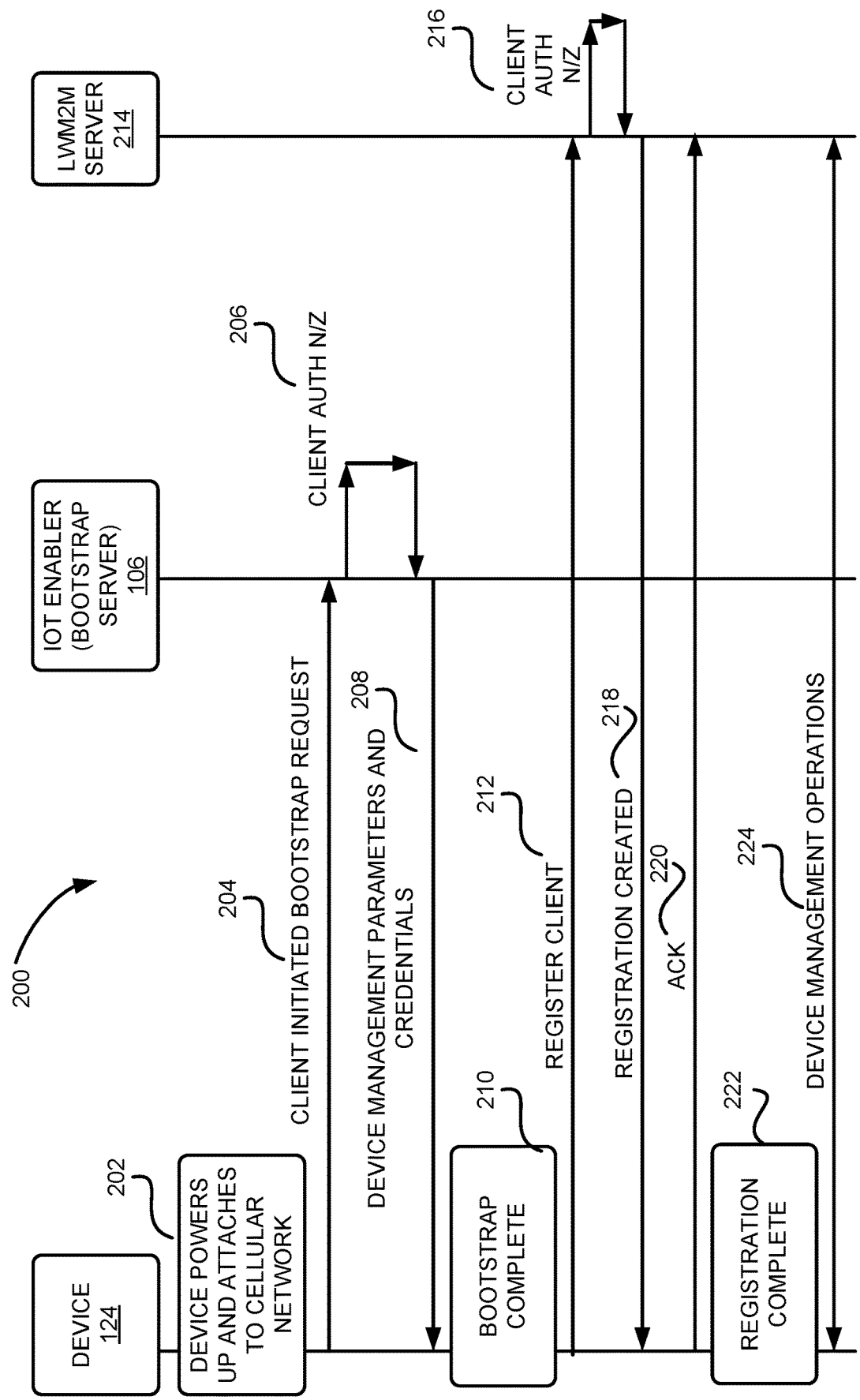
FIG. 2 is an illustrative process for bootstrapping an IoT device using a bootstrap SIM, in accordance with some examples of the present disclosure.

FIG. 2 is process 200 for bootstrapping an IoT device 124 using the bootstrap SIM 102, according with various examples described herein. The process 200 and other processes described herein are illustrated as example flow graphs or signal diagrams, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The process 200 commences at operation 202, where the bootstrap SIM 102 has been inserted into the device 124 and the device 124 is powered up and attaches to the cellular network 108. Although different communication protocols may be used, in the present example, the device 124 communicates with the cellular network 108 using the TLS 128. At operation 202, the device 124 and its bootstrap SIM 102 are not authenticated. Therefore, the TLS 128 is used to limit access by the device 124 to only certain areas of the cellular network 108.

The process 200 continues to operation 204, where the device 124, using information provided by the bootstrap SIM 102, initiates a bootstrap request by communicating the request to the IoT enabler 106. In some examples, the IoT enabler 106 may also be called a bootstrap server.

In some examples, the cellular network 108 may have already authenticated the device 124 using other means, such as a one-time password. For example, the device 124 may be configured to attempt authentication or registration using conventional means as well as the bootstrap SIM 102. In this example, if a one-time password, which may have been installed on the device 124, has already been received, the IoT enabler 106 may send a notification to the device 124 that the device 124 is already authenticated.

In some examples when using the bootstrap information provided by the bootstrap SIM 102, the cellular network 108 may detect that the IoT enabler 106 is already in the process of authenticating the device 124 when the cellular network 108 receives a one-time password. In this instance, the cellular network 108 may send a notification to the device 124 to halt authentication using the one-time password.

The process 200 continues to operation 206, where the IoT enabler 106 accesses the certificate repository 118 to authenticate the device 124. The certificate repository 118 has stored therein data relating to the bootstrap SIM 102. In some examples, the IoT enabler 106 performs both an authN and authZ function, whereby the authN function is an authentication that establishes the identity of the bootstrap SIM 102 and/or device 124 and the authZ function is an authentication that establishes the privileges associated with the bootstrap SIM 102 and/or the device 124.

The process 200 continues to operation 208, where the IoT enabler 106 transmits to the device 124 device management parameters and credentials to be used when communicating on the cellular network 108. At operation 210, the bootstrap operation has been completed. The device 124 is authenticated and can commence use of the cellular network 108 once the device 124 is registered.

The process 200 continues to operation 212, where the device 124 transmits a register client signal to a Lightweight M2M (LWM2M) server 214. In some examples, the LWM2M server 214 is used to manage non-Internet Protocol, e.g. IoT, in a cellular network. The LWM2M server 214 uses the LWM2M protocol to allow for device and systems from various vendors to co-exist in an IoT environment.

The process 200 continues to operation 216, where the LWM2M server 214 authenticates the device 124. In some examples, the LWM2M server 214 performs both an authN and authZ function, whereby the authN function is an authentication that establishes the identity of the bootstrap SIM 102 and/or device 124 and the authZ function is an authentication that establishes the privileges associated with the bootstrap SIM 102 and/or the device 124.

The process 200 continues to operation 218, where a registration for the device 124 is created.

The process 200 continues to operation 220, where the device 124 acknowledges the receipt of the registration from the LWM2M server 214. At operation 222, the registration is completed and the process 200 continues to operation 224, where the device 124 interacts with the LWM2M server 214 via device 124 management operations.

Figure 3:
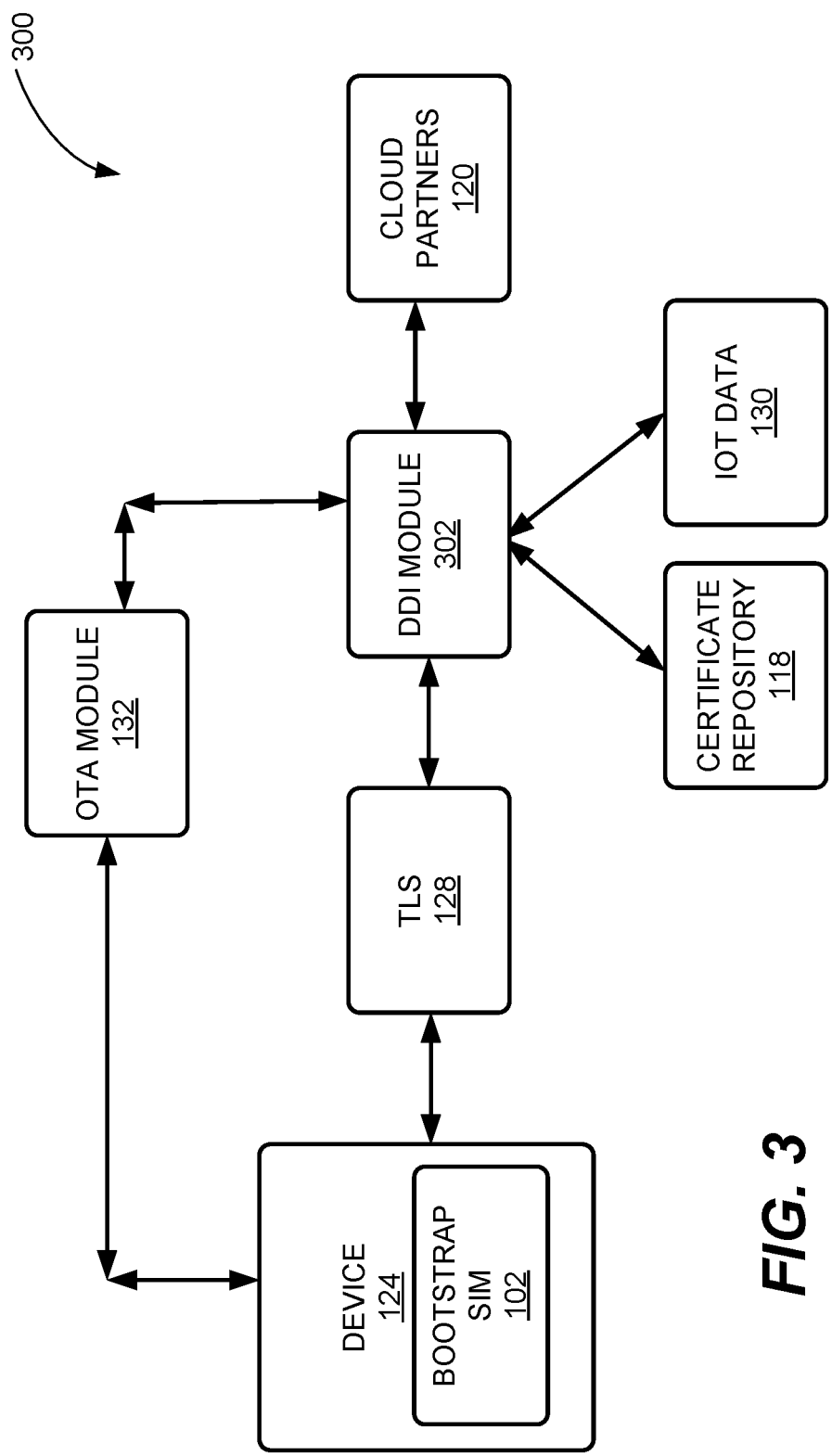
FIG. 3 is an alternate example environment for providing a bootstrap SIM, in accordance with some examples of the present disclosure.

FIG. 3 is an alternate environment 300 for providing a bootstrap SIM 102, in accordance with some examples of the present disclosure. In the environment 300 of FIG. 3, the device 124 has installed therein the bootstrap SIM 102. The device 124 may be one of various devices purchased by a user or provided by an entity, such as the cellular network 108 of FIG. 1, for use within an IoT environment. To authenticate the device 124 and the bootstrap SIM 102, the device 124 communicates with a DDI module 302. A DDI module 302 may be used by a cellular network, such as the cellular network 108 of FIG. 1, to manage operations of an IoT environment. In some examples, the DDI module 302 is a set of functions that provide for management, including, Domain Name System (DNS) management, Dynamic Host Configuration Protocol (DHCP) management, and IP Address management (IPAM).

The DDI module 302 can be used to integrate DNS, DHCP, and IPAM into a unified module. The DDI module 302, when an authentication request is received from the device 124, accesses the certificate repository 118 to authenticate the device 124. In some examples, the DDI module 302 performs similar functions to the IoT enabler 106 of FIG. 1 but may provide additional functionality as it relates to IoT services. The DDI module 302 may interface with the cloud partners 120 to provide information to other organizations. Further, the DDI module 302 may also be used to update the bootstrap SIM 102 with information received from the IoT data 130 or from the other sources. The OTA module 132 and the TLS 128 operate in a manner similar to that which is described for each in FIG. 1.

Figure 4:
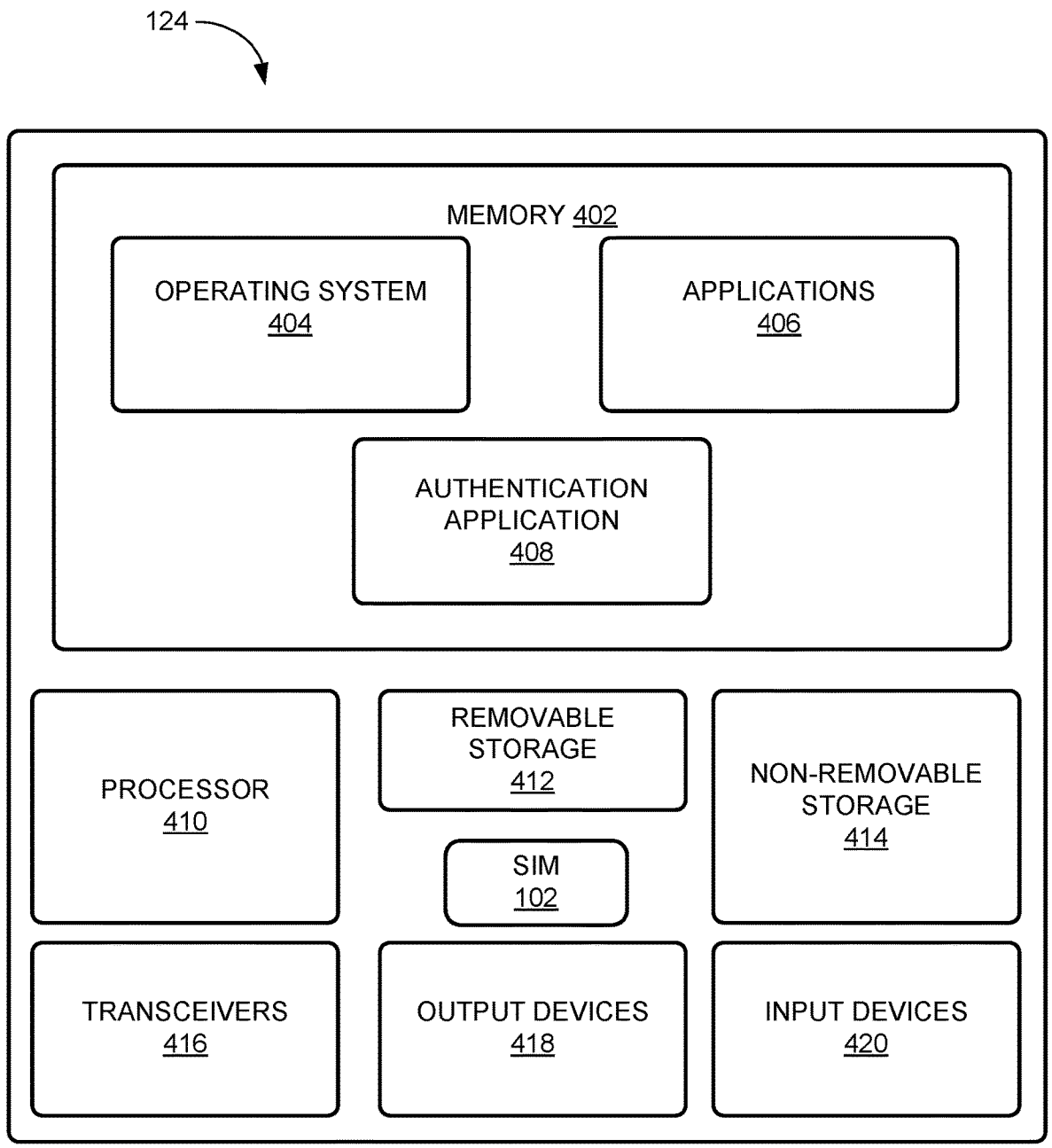
FIG. 4 depicts a component level view of a user device that uses a bootstrap SIM to bootstrap the authentication of the device on a cellular network, in accordance with some examples of the present disclosure.

FIG. 4 depicts a component level view of the user device 124 that uses the bootstrap SIM to bootstrap the authentication of the device 124 on the cellular network 108, according to the systems and methods described herein. The device 124 could be any device or combination of devices capable of providing the functionality associated with the systems and methods described herein. The device 124 can comprise several components, modules, software functions, or computing devices to execute the above-mentioned functions. The device 124 may be comprised of hardware, software, or various combinations thereof. As discussed below, the device 124 can comprise memory 402 including an operating system (OS) 404 and one or more standard applications 406. The standard applications 406 may include applications that provide for communication with the cellular network 108 and the device 124. The OS 404 varies depending on the manufacturer of the device 124. The OS 404 contains the modules and software that support basic functions of the device 124, such as scheduling tasks, executing applications, and controlling peripherals. In some examples, the OS 404 can enable an authentication application 408 that initiates an authentication request between the device 124 and the cellular network 108, and provide other functions, as described above, via transceiver(s) 416. The OS 404 can also enable the device 124 to send and retrieve other data and perform other functions.

The device 124 can also comprise one or more processors 410 and one or more of removable storage 412, non-removable storage 414, transceiver(s) 416, output device(s)

418, and input device(s) 420. In various implementations, the memory 402 can be volatile (such as random access memory (RAM)), non-volatile (such as read only memory (ROM), flash memory, etc.), or some combination of the two.

In some implementations, the processor(s) 410 can be one or more central processing units (CPUs), graphics processing units (GPUs), both CPU and GPU, or any other combinations and numbers of processing units. The device 124 may also include additional data storage devices (removable and/or non-removable) such as, for example, magnetic disks, optical disks, or tape. Such additional storage is illustrated in FIG. 4 by removable storage 412 and non-removable storage 414. The device 124 may further include the bootstrap SIM 102 installed within the device 124. In some examples, the bootstrap SIM 102 may be considered a type of removable storage.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the device 124. Any such non-transitory computer-readable media may be part of the device 124 or may be a separate database, databank, remote server, or cloud-based server.

In some implementations, the transceiver(s) 416 include any transceivers known in the art. In some examples, the transceiver(s) 416 can include wireless modem(s) to facilitate wireless connectivity with other components (e.g., between the device 124 and a wireless modem that is a gateway to the Internet), the Internet, and/or an intranet. Specifically, the transceiver(s) 416 can include one or more transceivers that can enable the device 124 to send and receive data using the cellular network 108. Thus, the transceiver(s) 416 can include multiple single-channel transceivers or a multi-frequency, multi-channel transceiver to enable the device 124 to send and receive video calls, audio calls, messaging, etc. The transceiver(s) 416 can enable the device 124 to connect to multiple networks including, but not limited to 2G, 3G, 4G, 5G, and Wi-Fi networks. The transceiver(s) can also include one or more transceivers to enable the device 124 to connect to future (e.g., 6G) networks, Internet-of-Things (IoT), machine-to machine (M2M), and other current and future networks.

The transceiver(s) 416 may also include one or more radio transceivers that perform the function of transmitting and receiving radio frequency communications via an antenna (e.g., Wi-Fi or Bluetooth®). In other examples, the transceiver(s) 416 may include wired communication components, such as a wired modem or Ethernet port, for communicating via one or more wired networks. The transceiver(s) 416 can enable the device 124 to facilitate audio and video calls, download files, access web applications, and provide other communications associated with the systems and methods, described above.

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 418 can also include speakers, or similar devices, to play sounds or ringtones when an audio call or video call is received. Output device(s) 418 can also include ports for one or more peripheral devices, such as headphones, peripheral speakers, or a peripheral display.

In various implementations, input device(s) 420 include any input devices known in the art. For example, the input device(s) 420 may include a camera, a microphone, or a keyboard/keypad. The input device(s) 420 can include a touch-sensitive display or a keyboard to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 420 and an output device 418.

Figure 5:
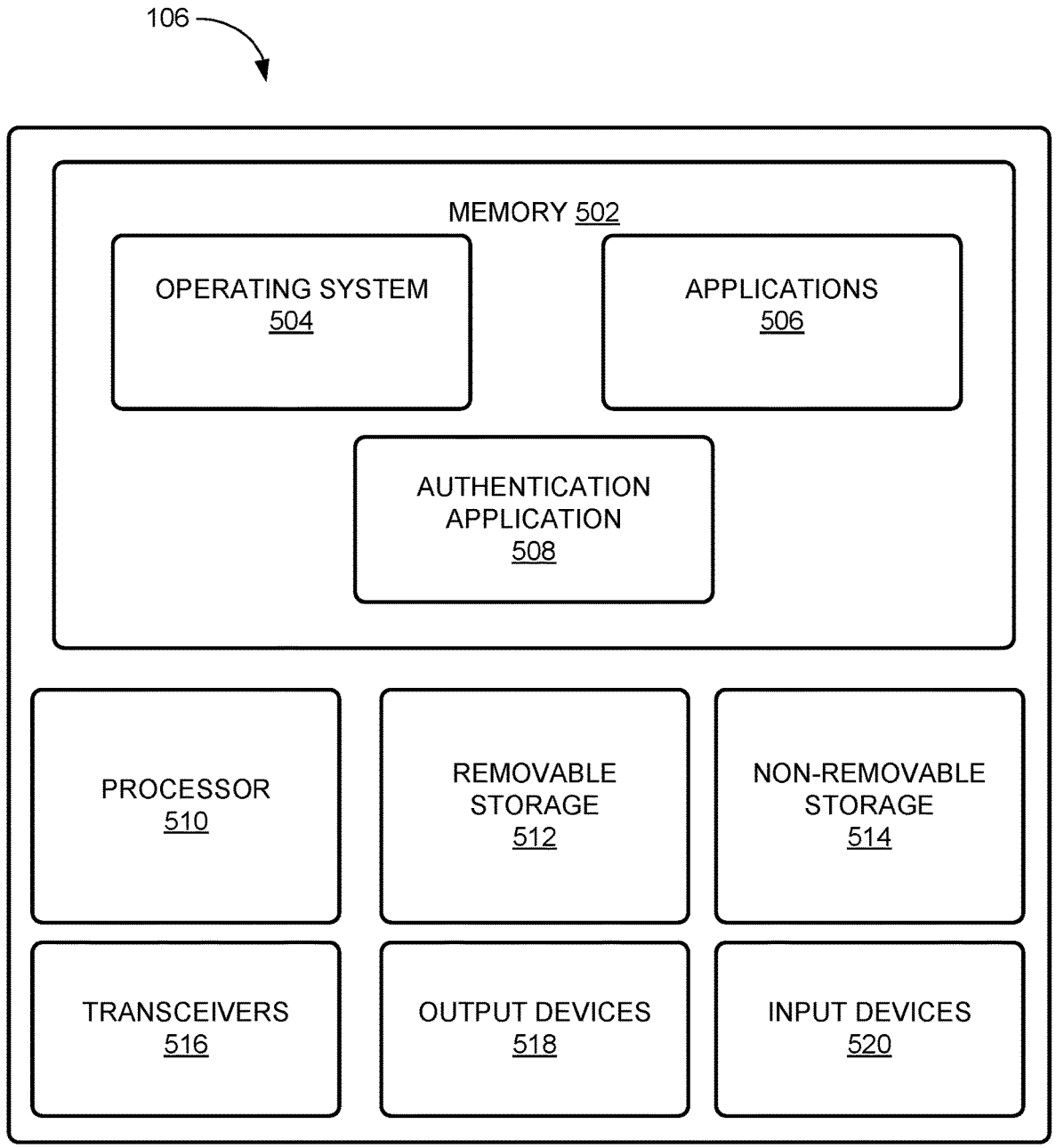
FIG. 5 depicts a component level view of an IoT enabler that is used to bootstrap a bootstrap SIM onto a cellular network, according to the systems and methods described herein.

FIG. 5 depicts a component level view of the IoT enabler 106 that is used to bootstrap the bootstrap SIM 102 onto the cellular network 108, according to the systems and methods described herein. The IoT enabler 106 could be any device or combination of devices capable of providing the functionality associated with the systems and methods described herein, including the DDI module 302 of FIG. 3. The IoT enabler 106 can comprise several components, modules, software functions, or computing devices to execute the above-mentioned functions. For example, the IoT enabler 106 may be configured to receive authentication requests from the device 124, the requests including bootstrap information comprising a mobile network operator profile and Public Key Infrastructure (PKI) certificate. The bootstrap information can include other information such as identifying information about the IoT device. This identifying information can include, but is not limited to, an international mobile equipment identity of the IoT device.

Further, the IoT enabler 106 may be configured to access the certificate repository 118 to authenticate the bootstrap information provided by the bootstrap SIM 102. The IoT enabler 106 may be comprised of hardware, software, or various combinations thereof. As discussed below, the IoT enabler 106 can comprise memory 502 including an operating system (OS) 504 and one or more standard applications 506. The standard applications 506 may include applications that provide for communication with the cellular network 108 and the device 124. The OS 504 varies depending on the manufacturer of the IoT enabler 106. The OS 504 contains the modules and software that support basic functions of the IoT enabler 106, such as scheduling tasks, executing applications, and controlling peripherals. In some examples, the OS 504 can enable an authentication application 508 that receives an authentication request between the device 124 and the cellular network 108, and provide other functions, as described above, via transceiver(s) 516. The OS 504 can also enable the IoT enabler 106 to send and retrieve other data and perform other functions, such as authentication and registration information.

The IoT enabler 106 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two.

In some implementations, the processor(s) 510 can be one or more central processing units (CPUs), graphics processing units (GPUs), both CPU and GPU, or any other combinations and numbers of processing units. The IoT enabler 106 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the IoT enabler 106. Any such non-transitory computer-readable media may be part of the IoT enabler 106 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the device 124 and a wireless modem that is a gateway to the Internet), the Internet, and/or an intranet. Specifically, the transceiver(s) 516 can include one or more transceivers that can enable the IoT enabler 106 to send and receive data using the cellular network 108.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the IoT enabler 106 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
    powering up an Internet of Things (IoT) device, wherein the IoT device is initially unauthenticated;
    reading bootstrap information from a subscriber identification module (SIM) installed on the IoT device;
    attaching the IoT device to a cellular network;
    initiating a bootstrap request by transmitting the bootstrap information stored on the SIM to a bootstrap server of the cellular network;
    transmitting an additional authentication request from the IoT device using a one-time password installed on the IoT device when the IoT device was manufactured; and
    receiving a notification to halt additional authentication using the one-time password because the IoT device is already authenticated using the bootstrap SIM.

2. The method of claim 1, further comprising:
    receiving device management parameters and credentials from the bootstrap server;
    transmitting a register client request to an IoT server of the cellular network using the device management parameters and credentials provided by the bootstrap server;
    receiving a notification of a creation of a registration of the IoT device; and
    transmitting an acknowledgement of the registration.

3. The method of claim 1, further comprising receiving an over the air update from the bootstrap server during the bootstrap request with the bootstrap server.

4. The method of claim 1, further comprising updating the one-time password.

5. The method of claim 1, wherein the bootstrap information includes identifying information about the IoT device.

6. The method of claim 5, wherein the identifying information comprises an international mobile equipment identity of the IoT device.

7. An IoT device, comprising:
    a memory storing computer-executable instructions;
    a bootstrap Subscriber Identity Module (SIM) having bootstrap information comprising a mobile network operator profile and Public Key Infrastructure (PKI) certificate, the bootstrap information stored on the bootstrap SIM; and a processor in communication with the memory, the computer-executable instructions causing the processor to perform acts comprising:
  reading bootstrap information from a subscriber identification module (SIM) installed on the IoT device;
  attaching the IoT device to a cellular network;
  initiating a bootstrap request by transmitting the bootstrap information stored on the SIM to a bootstrap server of the cellular network;
  transmitting an additional authentication request from the IoT device using a one-time password installed on the IoT device when the IoT device was manufactured; and
  receiving a notification to halt additional authentication using the one-time password because the IoT device is already authenticated using the bootstrap SIM.

8. The IoT device of claim 7, further computer-executable instructions for:
  receiving device management parameters and credentials from the bootstrap server;
  transmitting a register client request to an IoT server of the cellular network using the device management parameters and credentials provided by the bootstrap server;
  receiving a notification of a creation of a registration of the IoT device; and
  transmitting an acknowledgement of the registration.

9. The IoT device of claim 7, further computer-executable instructions for receiving an over the air update from the bootstrap server during the bootstrap request with the bootstrap server.

10. The IoT device of claim 7, further computer-executable instructions for updating the one-time password.

11. The IoT device of claim 7, wherein the bootstrap information further includes identifying information about the IoT device.

12. The IoT device of claim 11, wherein the identifying information comprises an international mobile equipment identity of the IoT device.

13. A non-transitory computer-readable storage medium having computer-executable instructions stored thereupon that, when executed by a computer, cause the computer to perform acts comprising:
  receiving, at a bootstrap server of a cellular network, a bootstrap request from an IoT device comprising bootstrap information, the bootstrap information comprising a mobile network operator profile and a Public Key Infrastructure (PKI) certificate stored on a bootstrap SIM installed on the IoT device;
  requesting certificate information relating to the bootstrap SIM from a certificate repository;
  authenticating the certificate information;
  receiving an additional authentication request from the IoT device using a one-time password installed on the IoT device when the IoT device was manufactured;
  determining that the IoT device is already authenticated using the SIM; and
  sending a notification to the IoT device to halt additional authentication using the one-time password.

14. The non-transitory computer-readable storage medium of claim 13, further comprising computer-executable instructions that, when executed by the computer, cause the computer to perform the act comprising receiving an over the air update from the bootstrap server during the bootstrap request with the bootstrap server.

15. The non-transitory computer-readable storage medium of claim 13, further comprising computer-executable instructions that, when executed by the computer, cause the computer to perform the act comprising updating the one-time password.

16. The non-transitory computer-readable storage medium of claim 13, wherein the bootstrap information further comprises an international mobile equipment identity of the IoT device.

\* \* \* \* \*